Patented Oct. 21, 1930

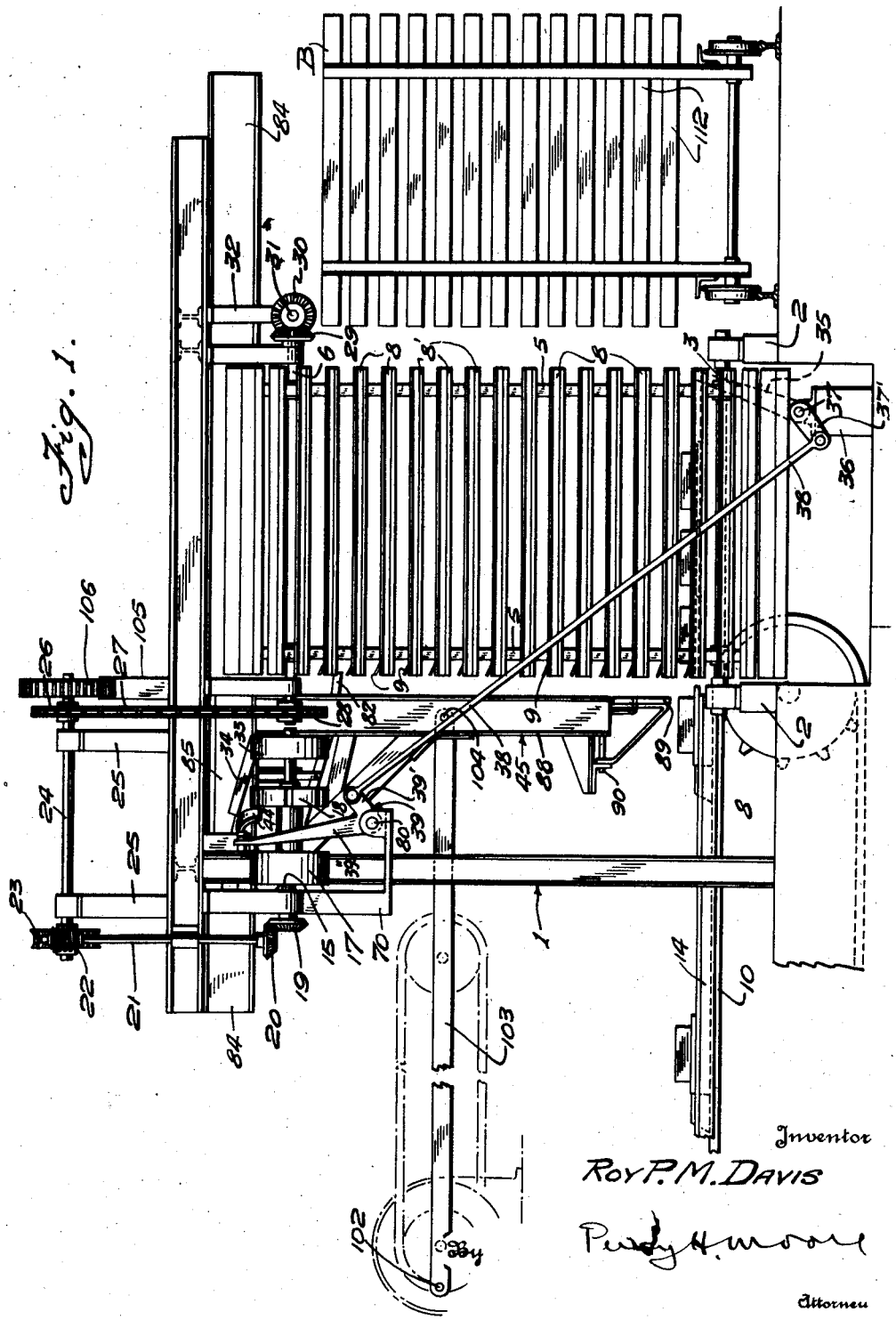

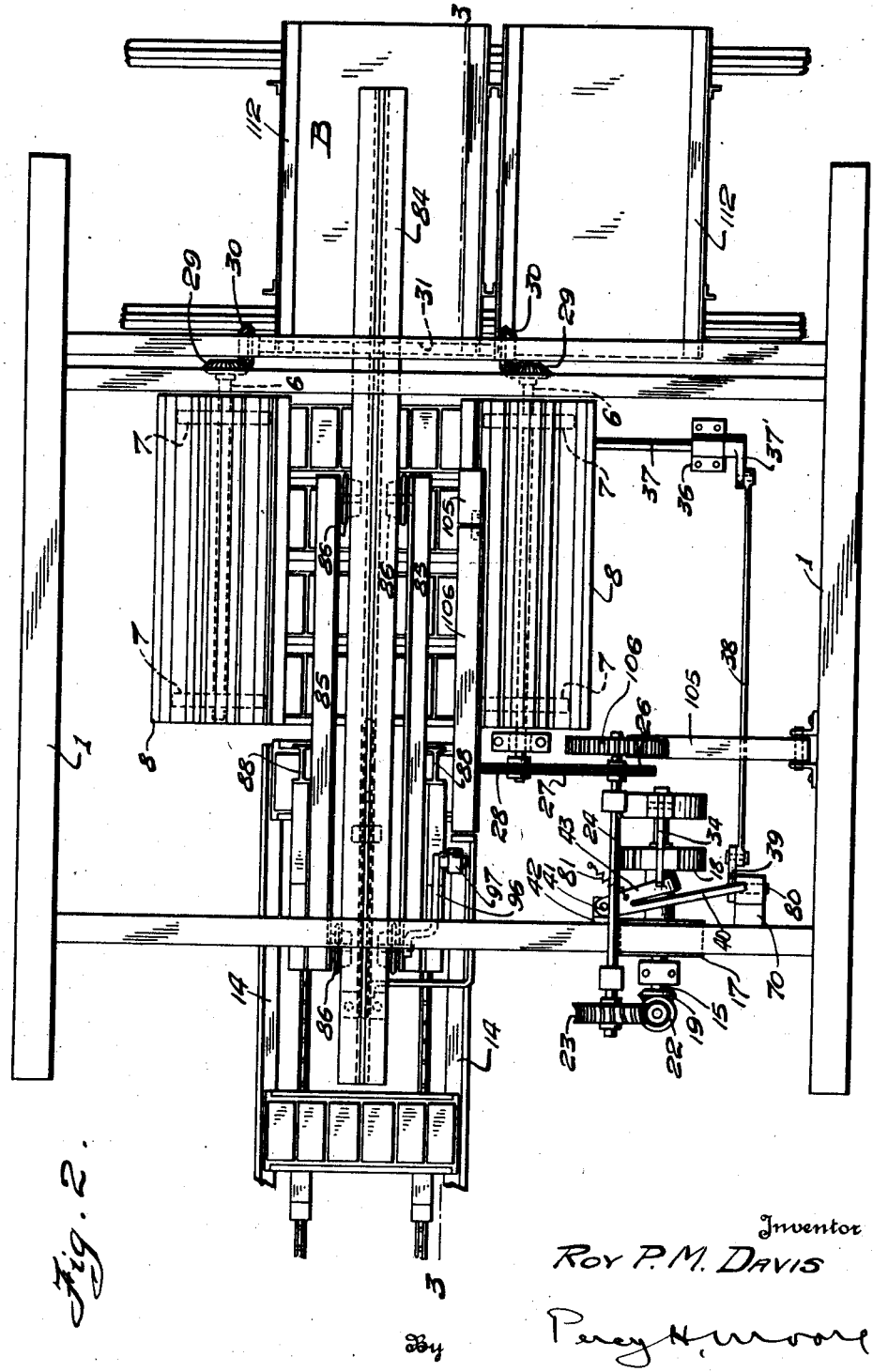

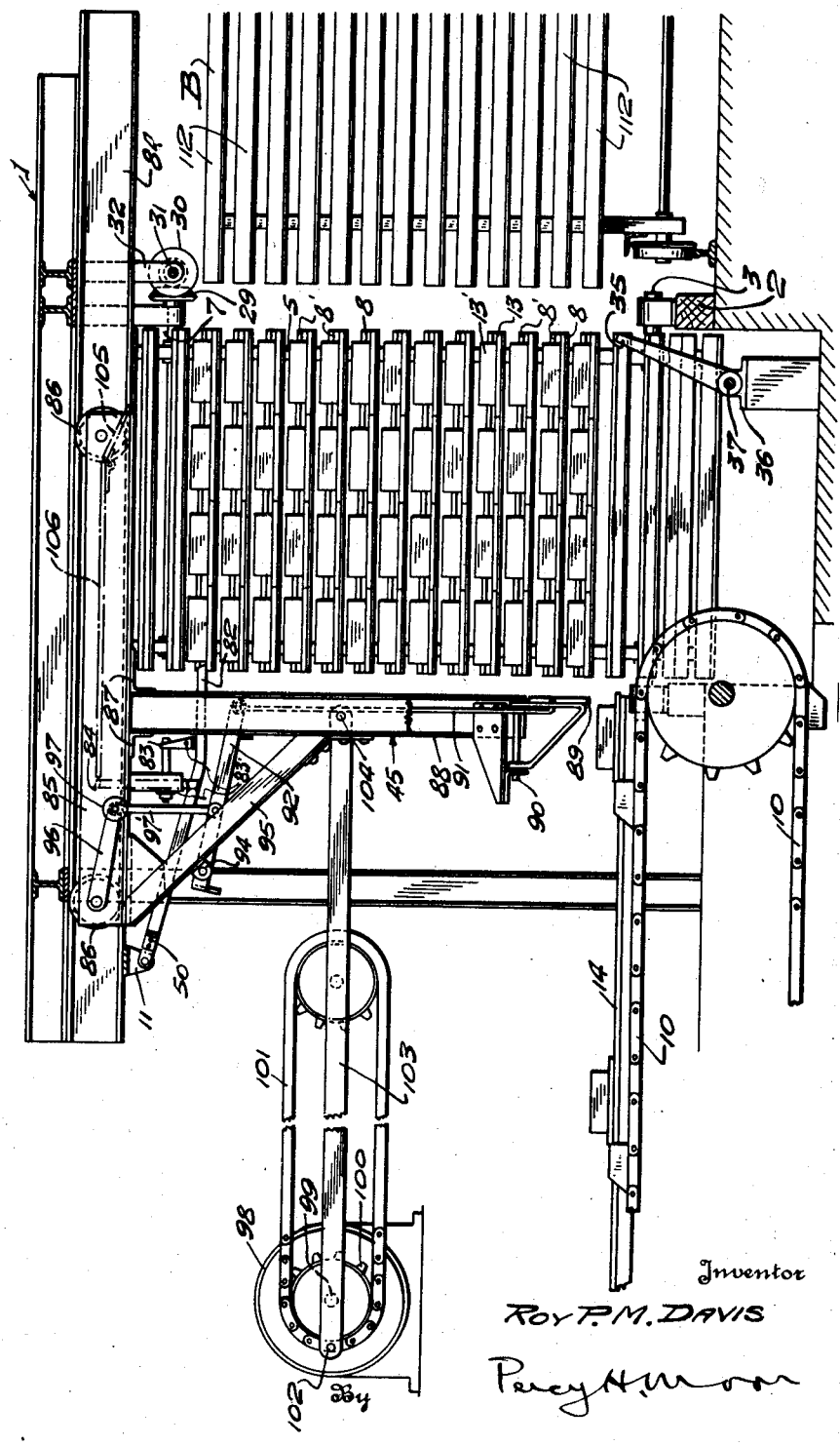

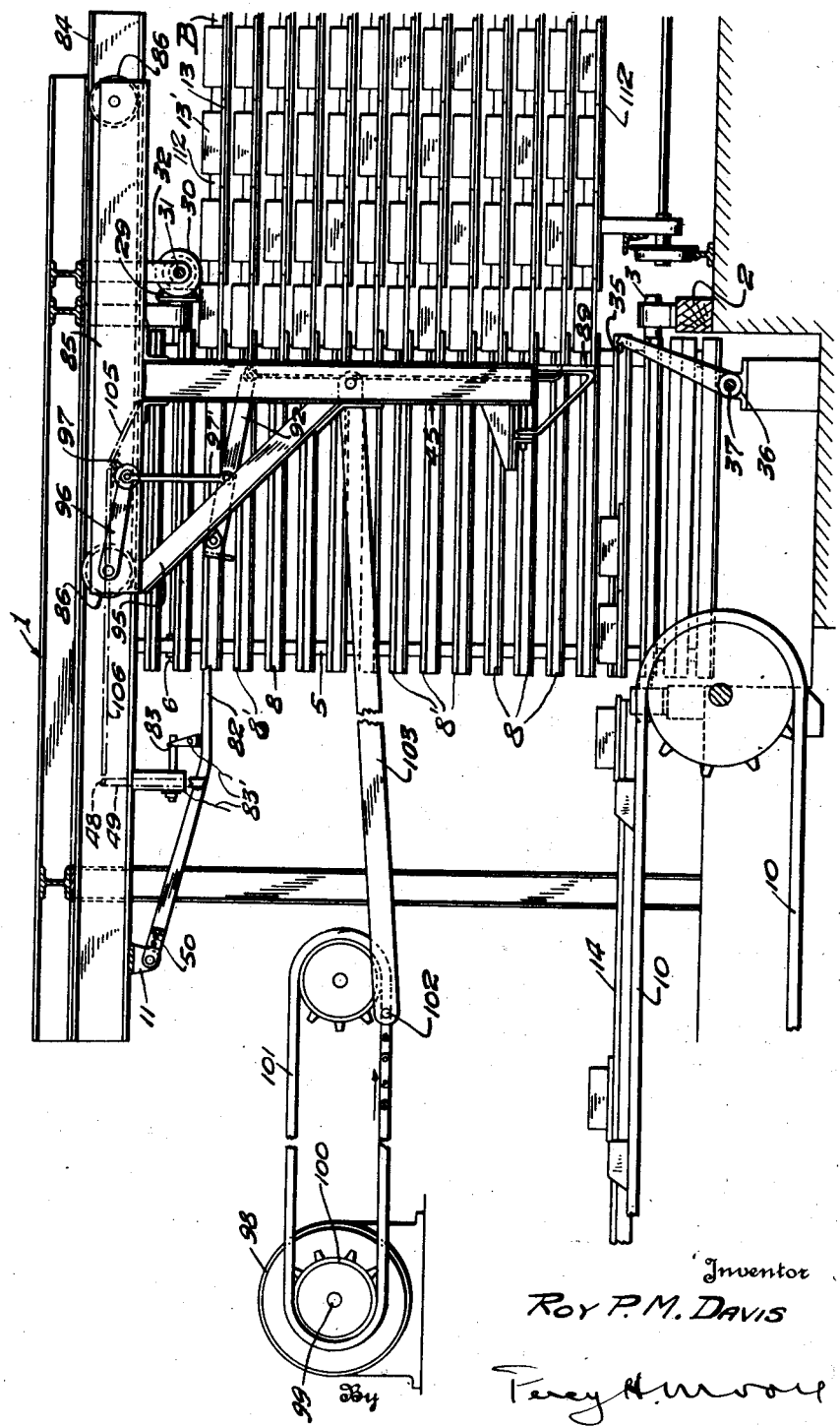

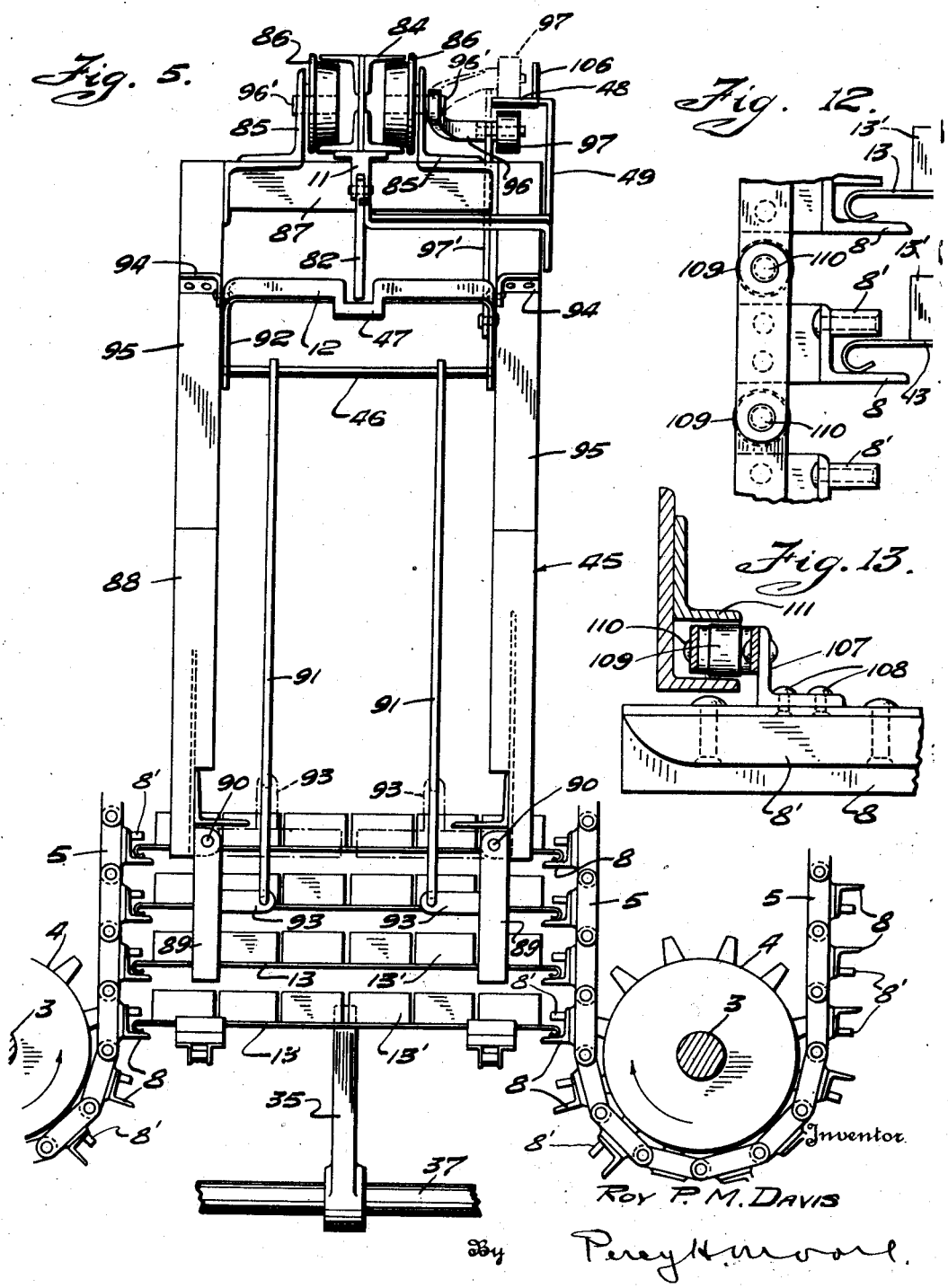

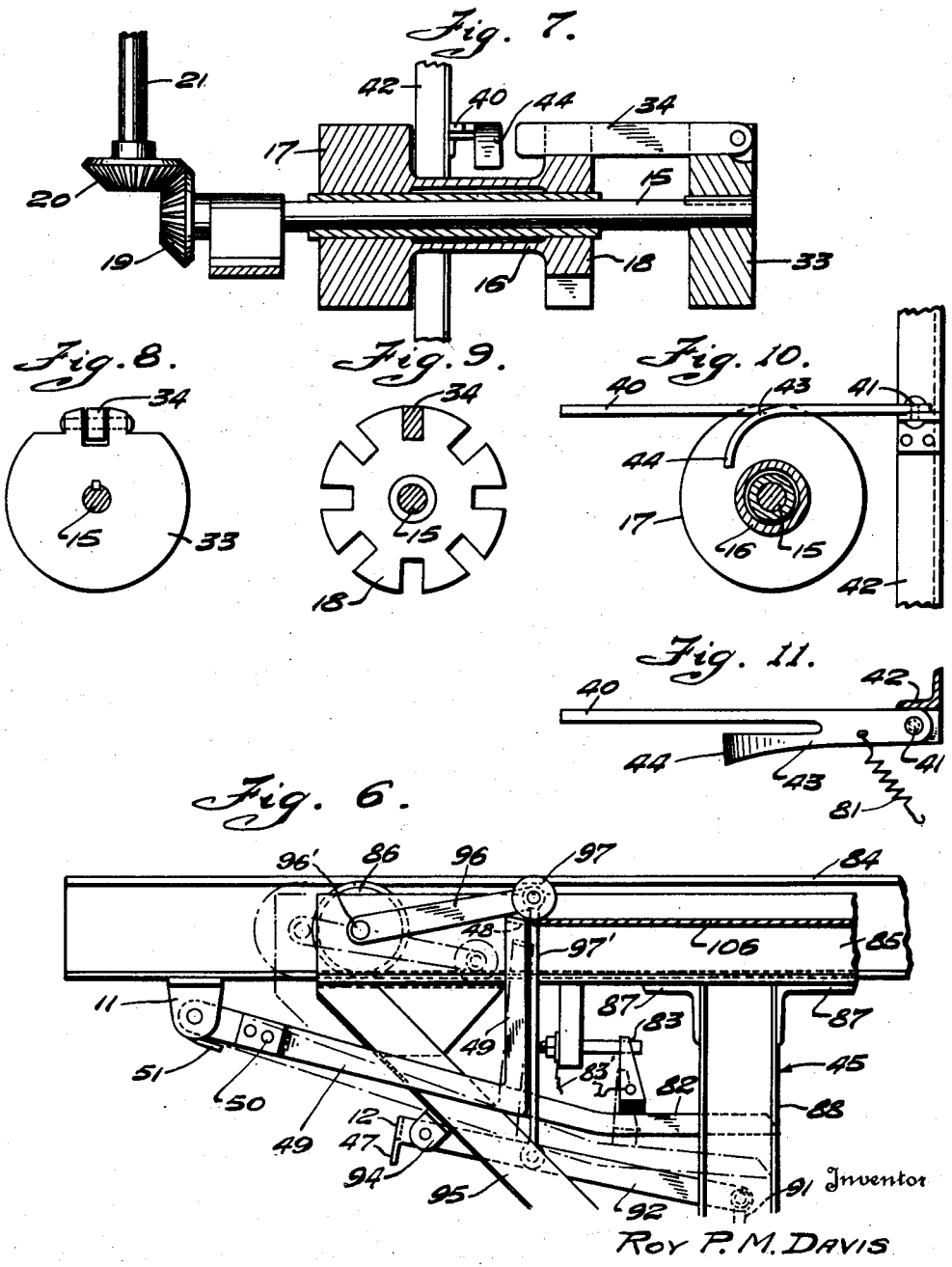

1,779,210

UNITED STATES PATENT OFFICE

ROY P. M. DAVIS, OF MOUNT UNION, PENNSYLVANIA

RACKING MACHINE

Application filed June 11, 1929. Serial No. 370,129.

My invention relates to improvements in brick storage loading machines and is more particularly adapted for use in that type of machine adapted for the handling of brick from a brick making machine.

The present invention represents an improvement over Patent No. 1,606,477 issued to William H. McClelland, November 9th, 1926.

The principal object of my invention is to provide means for automatically and continuously placing loaded pallets, that is pallets with brick thereon, in their proper positions within a drying car, without injury to the delicate brick.

This application is more specifically directed to the means for continuously receiving the loaded pallets from the brick making machine and arranging the same in groups or tiers in such a position that a plurality of groups may be automatically and continuously transferred to a conventional drying car.

Another object of the invention is to provide an endless conveyor for removing the loaded pallet from the delivering mechanism and elevating the same upwardly so that the loaded pallet may be positioned in line with a corresponding rack in the drying car.

Still another object of my invention is to provide means for moving the vertical elevator step by step, at a distance equal to the space between the racks of the drying car.

Still another object of the invention is to provide a loader of the class described which is adapted to load only one half of the rack car at a time, it being understood that the rack car used in connection with this application is one in which a central vertical wall is provided and upon each side of which is adapted to be placed rows of loaded pallets.

Other and further objects and advantages will be apparent as the specification is considered in connection with the accompanying drawings.

Heretofore, considerable time has been lost in the operation of loading machines due to the necessity for causing the elevator actuating mechanism to pause while the push arm employed for pushing the loaded pallets from the elevator to the dryer car returns to its normal position. This objection is overcome by the present invention.

Briefly stated, the present application is directed to a machine wherein the loaded pallets from the brick-making machine are conveyed by suitable delivery mechanism to elevators from which the loaded pallets are transferred to drying cars. These elevators comprise pairs of spaced endless vertical conveyors having upon their outer or operative faces angle bars which form a support for the loaded pallets when the latter are slipped in between the endless conveyors. The vertical conveyors are moved step by step and at the completion of each step a series of pallets, preferably four in number, is delivered to a pair of bars or supporting racks carried by the conveyors. After the vertical conveyors have been loaded, a conventional drying car having racks corresponding to the bars or racks of the elevator, having been moved into alignment or level with the racks of the elevator, the pallets are then pushed from the racks of the elevator to the racks of the drying car, by means of folding pusher bars which are automatically folded upon completion of the working stroke to permit of their return to normal position without interference from pallets being fed to the lowermost rack bars of the elevator during the unloading of the bars thereabove.

A preferred and practical embodiment of the invention is illustrated in the accompanying drawings, in which:

Figure 1 is a side elevation of racking machine in which the present invention is embodied;

Figure 2 is a plan view of the machine;

Figure 3 is a sectional elevation taken along the line 3—3 of Figure 2;

Figure 4 is a sectional elevation of the pusher bar in its forward position showing the loaded pallets being pushed into the rack car;

Figure 5 is an enlarged front elevation of the pusher bar mechanism;

Figure 6 is an enlarged fragmentary view of the automatic make and break connection for the pusher bar motor;

Figure 7 is a sectional view of the elevator mechanism clutch;

Figure 8 is a side view of the fixed disk of the elevator mechanism clutch;

Figure 9 is a detail of the clutch wheel of the elevator mechanism;

Figures 10 and 11 are details of the cam lever of the clutch mechanism;

Figure 12 is a detailed view showing a section of the belt or chain which forms a part of the vertical conveyor or elevator;

Figure 13 is a detailed view showing one section of a rack bar of the elevator and guide means carried thereby.

Referring more specifically to the drawings wherein like reference numerals denote corresponding parts throughout the several views, the numeral 1 indicates a suitable skeleton frame formed of angle iron, or the like, and to which is connected the supporting elements of the various mechanism hereinbefore referred to. Positioned within the skeleton frame 1 are base members 2 which have secured thereto, as disclosed in Figure 5, a pair of spaced horizontal shafts 3 mounted within suitable bushings carried by the members 2. Each shaft 3 has keyed thereto adjacent its end portions sprocket gears 4 around which pass suitable chains 5. Supported by the uppermost beam of the skeleton frame 1 is a corresponding pair of spaced shafts 6, which likewise have keyed thereto sprocket gears 7 around which the endless chains 5 also pass. The active faces, that is, the outer face of each pair of chains 5, have suitably secured thereto the opposite ends of angle iron bars or racks 8 and, it will be noted in Figure 1, that one end of each bar is cut and bent downwardly as indicated at 9, the purpose of which being to facilitate the placing of the loaded pallets between the chains 5 and upon opposing angle irons or rack bars 8. In spaced relation with the supporting surface of rack bars 8, are confining ribs 8', which serve to maintain the pallets in place. The chains 5 it will be noted, are so arranged in pairs and each pair so spaced as to receive therebetween loaded pallets 13 which are received by and supported upon the angle irons or racks 8, and elevated thereby step by step in a manner hereinafter described.

As disclosed in Figures 12 and 13 each angle iron bar or rack bar 8 is connected to one link of the chain 5, by angle member 107, rivets 108, being employed for this purpose. The links of the chain 5 have positioned therein rollers 109 mounted on pins 110 and engaging within guides 111 suitably positioned in the frame 1, adjacent the active side of the chains. The purpose of the guides 111 is to prevent the inward movement of the chains between the shafts 3 and 6, thus preventing the dropping of the pallets carried by the bars 8.

The pallets 13 with brick 13' thereon, are delivered between the vertical conveyors and positioned on the racks 8 thereof by means of an endless belt or chain conveyor 10, continuously driven from any suitable source (not shown), in conjunction with the guide bars or tracks 14, it being understood that loaded pallets are at all times being fed from the brick machine (not shown) to the belt or chain conveyor 10. The entrance and the filling of one rack of the elevator by a series of loaded pallets automatically causes the elevator to move one step so that a group of loaded pallets will be lifted from the horizontal plane of the conveyor 10 and the next adjacent rack of the elevator elevated for loading in like manner. This step by step movement of the elevator is effected as follows:

The frame 1 has secured thereto a suitable shaft 15 upon which is loosely mounted a sleeve 16, one end of which has formed integral therewith or fixed thereto, a belt wheel 17, while the other end has secured thereto in a like manner, a toothed wheel 18. One end of the shaft 15 has keyed thereto a beveled gear 19 which meshes with a second beveled gear 20, carried by a vertically disposed shaft 21, the upper end of which has keyed thereto a worm gear 22, engageable with a worm gear 23 fixed to a horizontally arranged shaft 24 mounted in suitable brackets 25 positioned upon the frame 1. The outer end of the shaft 24 has keyed thereto a sprocket wheel 26 around which passes a sprocket chain 27 which transmits motion to a second sprocket wheel 28 keyed to one end of one of the shafts 6. In order that the other vertical conveyor may be operated in unison with the first, the opposite end of the first mentioned shaft 6 has fixed thereto a beveled gear 29 which engages a corresponding gear 30 fixed to a horizontal cross shaft 31, supported by suitable brackets 32, depending from the main frame 1. The other end of the shaft 31 is connected to the second of the shafts 6 in a similar manner so that any rotary motion imparted to the first mentioned shaft 6 through the various shafts hereinbefore referred to, will be imparted to the second of the shafts 6.

For the purpose of connecting the driving mechanism just described to the belt wheel 17, the free end of the shaft 15 has keyed thereto a disk 33 to which is pivotally connected a lever 34, the free end of which is normally received between the teeth of the wheel 18 so that any rotary motion imparted to the wheel 18, through the medium of the belt pulley 17, will be imparted to the shaft 15 by means of the disk 33 and its connection with the belt pulley 17.

To effect movement of the vertical conveyor in a step by step manner, I have positioned a lever 35 in line with the delivery track 14 and in such position that when one pair of the rack bars 8 are loaded, the first loaded pallet 13 thereon will engage the lever 35. This lever 35 is fixedly secured to one end of a horizontal shaft 37 mounted in bearings 36. The other end of the shaft 37 has a crank arm 37' which is pivotally connected to the lower end of a rod 38, the upper end of which is connected to the short arm 39' of a bell crank lever 39, the latter being pivotally mounted as at 80 in a suitable bracket 70 secured to the main frame 1. The longer arm 39'' of the bell crank lever 39 has pivotally connected thereto a horizontally arranged arm 40, the free end of which is pivotally supported as at 41 by a suitable support 42 connected to the main frame 1. The arm 40 has formed integral therewith a finger 43 the free end of which is bent downwardly, as indicated at 44 in Figures 1 and 10, to form a cam which is adapted to be engaged by and to normally support the free end of the lever 34 out of engagement with the toothed disk 18, as illustrated in Figure 1. From this structure it will be observed that as the loaded pallets are delivered into the vertical elevator, the first pallet on a pair of loaded rack bars 8 will be pushed into engagement with the free end of the arm 35, thus swinging the free end of this arm forwardly and downwardly and transmitting motion through the shaft 37, crank arm 37' and rod 38 to the bell crank 39. This movement of the bell crank 39, causes the longer arm 39'' thereof to swing forwardly upon the pivot 80 and move the horizontally disposed arm 40, together with its finger 43 from Figure 1 to Figure 7 position, so that the lever or latch member 34 which is normally supported by the cam portion 44 of finger 43, will drop and engage between the teeth of the disk 18, thus connecting the drive shaft 15 with the belt pulley 17, and in turn transmitting motion to the vertical elevator, thus causing the elevator and the loaded racks thereof to move upwardly. After the pallet disengages the lever 35, suitable spring mechanism 81 will cause the arm 40 to again move upon its pivot to Figure 1 position so that the cam 44 carried thereby will engage the free end of the lever 34 and lift the same out of engagement with the toothed wheel 18 upon the revolution of the wheel. The intermittent raising of the rack bars or ribs continues until a predetermined number of the racks of the elevator have been loaded, preferably a number corresponding to the number of racks in the rack or drier car B. A ratchet 105 engaging with ratchet wheel 106 on shaft 24 prevents reverse movement or rotation of the elevators under the weight of the pallets thereon. When this loading has occurred a pallet on the uppermost loaded rack strikes and elevates the arm 82, thus electrically connecting the wires 83' and closing the switch 83. This causes power to be applied to the pusher frame or member 45, which is vertically arranged and adapted to move in a vertical plane between the conveyors, thus pushing from the racks of the conveyors the loaded pallets and transferring them to the racks of the drying car B. The arm 82, it will be noted, is pivotally connected, by bracket 11, to a monorail 84, in turn suitably supported in the frame 1.

The pusher member 45, which is suspended from the monorail 84, comprises two spaced longitudinally extending angle beams 85 each of which has mounted therein the axles 96' of flanged wheels 86, which wheels engage with and ride upon the monorail 84, the latter being, as previously stated, suitably supported in the frame 1. The angle beams 85 are secured to a cross beam 87 which extends between and supports a pair of depending push arms 88, provided at their lower ends with folding arms 89, pivotally mounted on pins 90 thus permitting the arms to swing towards each other to a horizontal position. These folding arms are controlled by rods 91 pivotally connected at their lower ends to offset portions or projections 93 on the folding arms, and at their upper ends pivotally connected to a cross rod 46 extending between and connected to the ends or arms 92 of a substantially U-shaped member 12 which member is in turn pivotally connected to brackets 94, attached to the brace members 95 of the pusher frame. A curved lever 96 pivotally mounted at one end on the axle 96' of one of the flanged wheels 86, and carrying roller 97 at its other end, is pivotally connected to the U-shaped member or arm 12 by link 97'. The member 12 is offset as at 47 to permit of the member 12 clearing the arm 82 during the forward or working stroke of the pusher frame.

As previously explained, when the arm 82 is tripped by one of the topmost series or groups of loaded pallets on the elevator, the switch 83 is automatically closed and the motor 98 started. The motor 98 is suitably connected to and drives, through reducing gearing (not shown) the shaft 99 upon which is fixed a sprocket wheel 100, over which the chain 101 runs. This chain has extending from one link thereof a pin 102, to which is pivotally connected one end of a connecting rod 103, the other end of which is pivotally connected to the pusher frame 45, as at 104. Consequently, rotary movement of the chain is translated through the connecting rod 103 into a to and fro horizontal movement of the pusher frame 45 along the monorail 84, thus causing the pusher arms 88 of the pusher frame to first engage and push the loaded pallets from the rack bars of the elevator onto the alined corresponding racks 112 of the rack car B, as shown in Figure 3, and then return to original or Figure 1 position. As the limit of forward movement of the pusher arms is reached the roller 97, passes beneath and just beyond the hinged downwardly inclined gate 105, connected to and forming a continuation of a track 106 in turn secured to and supported from the frame 1, in any suitable manner, not shown. Roller 97 now rides up the gate 105 onto and then back over the track 106 during the return movement of the pusher frame. This upward movement of the roller lifts the folding arms 89 to a horizontal position, in effect shortening the pusher arms, of which the folding arms constitute a continuation, during the return stroke of the pusher frame. This folding movement is necessary to avoid interference between the pallets and the pusher arms, because the loaded pallets are being continuously fed into the elevator from conveyor 10, during the return stroke, and the elevator is continuing its step by step upward movement. In this connection it should be noted that it is essential that the guide rails or tracks 14 from which the loaded pallets are fed to the rack bars 8, must be on a level below that of the lowest pair of rack bars 8 being unloaded. To put it another way, the lowermost loaded bars 8, must be elevated above the level of tracks 14, before the unloading operation can be effected.

When the pusher frame has returned to its rear or starting position, roller 18 rides off the rear end of track 106, and engages the beveled free end 48 of an angularly shaped arm 49 the other end of which is rigidly attached to the switch actuating arm or lever 82, as at 50. As the roller 97 rides over the free end of arm 49, the latter is positively forced downwardly, thereby rocking the arm or lever 82 on its pivot and restoring the switch 83 to open position and thus stopping the motor 98 which drives the pusher frame. The arm or lever 82 is positively rocked in a downwardly direction by the pulling and pressing action of the roller 97 until the arm engages and rests upon the stop 51. At this time the roller rides off the beveled end 48 of the arm 49 and drops down to the position illustrated by dotted lines in Figure 6, thus permitting the folding ends or arms 89 of the pusher arms 88 to drop by gravity to their normal vertical position ready for the next operation.

From the foregoing it will be seen that loaded pallets are gently placed or pushed one at a time upon the elevator racks 8 until every rack thereon, or a number of racks corresponding to the racks of the drier car have been filled. When the elevator has been completely loaded, the multiplicity of loaded pallets are gently transferred, by a single pushing operation of the pusher arms 88 to the rack car, and the folding extensions 89 are then automatically folded and returned. It will also be noted that during the loading of the pallets into the drier car from the loaded racks of the elevator, as likewise during the return movement of the pusher arm, that loaded pallets are being constantly fed to the tracks 14 and from there to the unloaded rack of the elevator, next beneath the lowest rack being unloaded.

Having thus described my invention, what I claim is:

1. In a brick storage loading machine, an elevator having a plurality of spaced racks for supporting pallets thereon, means for delivering loaded pallets continuously to the elevator, a rack car adjacent to and having racks similar to and level with the racks of the elevator, means for elevating the racks of the elevator, a pusher member, means for moving said pusher member forwardly and rearwardly across the vertical path of movement of the elevator racks for simultaneously pushing the loaded pallets from the elevator racks to the racks of the rack car, said pusher member having folding members normally vertically disposed, and means for lifting said folding members to horizontal position as the pusher member starts on its return movement.

2. In a brick storage loading machine, a pair of spaced vertically disposed endless conveyors each of which is provided with a series of horizontally arranged racks, said racks of each conveyor adapted to support therebetween a series of loaded pallets, a rack car adjacent to and having racks similar to and level with the racks of the conveyors, means for continuously feeding loaded pallets to the first mentioned racks, means for driving the conveyors, pusher means movable forward and back between the conveyors for moving the loaded pallets from the conveyor to the rack car, power means for reciprocating said pusher means, and means adapted for engagement by a loaded pallet on the topmost rack of the conveyor when said topmost rack has been loaded for actuating said power means, and means for rendering said power means inoperative when said pusher means has finished its return stroke.

3. In a brick storage loading machine, a pair of spaced vertically disposed conveyors, each provided with horizontally arranged racks, means for continuously feeding loaded pallets to the racks, a rack car adjacent to and provided with racks level with the racks of the conveyors, means for moving the conveyors upwardly, an elevated track, a pusher member mounted on said track and movable between the conveyors for pushing the loaded pallets from the conveyor racks to the racks of the rack car, said pushing member having folding arms, power means for moving said pusher member forward and return along said tracks, automatic means for folding said arms operable as the pushing member starts on its return stroke, means tripped by a pallet on the topmost rack of the conveyors when the conveyors have been loaded for actuating said power means, and common means for returning the arms to normal unfolded position and for rendering said power means inoperative when said pusher frame has completed its return stroke.

4. In a brick storage loading machine, an elevator having a plurality of spaced racks for supporting pallets thereon, means for delivering loaded pallets continuously to the elevator, means for actuating the elevator, a rack car adjacent the elevator having racks level with the racks of said elevator, a pallet pusher frame, power means for reciprocating the frame to first cause the latter to simultaneously push said loaded pallets forwardly from the racks of the elevator to the racks of the rack car and then return to original position, means adapted for engagement by a loaded pallet on the topmost rack of the conveyor when said topmost rack has been loaded for actuating said power means, means for elevating a portion of said pusher frame whereby the frame will not interfere during its return stroke with loaded pallets being fed to the elevator while the latter is being unloaded and means operative at the end of the return stroke of said pusher frame for returning the said portion of said frame to normal position and for simultaneously rendering said power means inoperative.

5. In a brick storage loading machine, an elevator having a plurality of spaced racks for supporting pallets thereon, a conveyor for delivering loaded pallets continuously to the elevator, a rack car adjacent to and having racks similar to the racks of the elevator, means for elevating the racks of the elevator, a pusher member, means for moving said pusher member forwardly and rearwardly across the horizontal path of movement of the elevator racks for simultaneously pushing the loaded pallets from a plurality of the elevator racks to a corresponding number of racks of the rack car, said pusher member having folding members normally vertically disposed, and means for lifting said folding members to horizontal position as the pusher member starts on its return movement, said conveyor being positioned outside the elevator and below the plane of the lowest elevator rack being unloaded, whereby the next adjacent lower rack of the elevator may be continuously loaded during the unloading operation and the return movement of the pusher member.

6. In a brick storage loading machine, an elevator having a plurality of spaced racks for supporting pallets thereon, means for delivering loaded pallets continuously to the bottom rack of the elevator, means for actuating the elevator to elevate said racks, a rack car adjacent the elevator having racks level with the racks of said elevator, a reciprocating pallet pusher frame, the lowermost loaded rack on said elevator when elevated above loading position being in the path of movement of the lower portion of said frame, means for reciprocating the frame to first cause the latter to simultaneously push said loaded pallets forwardly from the racks of the elevator to the racks of the rack car and then return to original position, and means for elevating the said lower portion of said pusher frame above the level of the said lowermost loaded elevator rack whereby the frame will not interfere during its return stroke with loaded pallets being fed to the elevator while the latter is being unloaded.

7. In a brick storage loading machine, a vertically disposed elevator having a plurality of spaced racks for supporting pallets thereon, means for delivering loaded pallets to the elevator, a rack car adjacent the elevator having racks level with and substantially similar to the racks of the elevator, means for elevating the racks of the elevator, reciprocating pallet unloading means adapted to engage and push the pallets from the elevator racks to the racks of the rack car, driving means for the pallet unloading means and a trip for actuating the same, said trip being so positioned in the vertical path of the loaded pallets on the racks of the elevator, whereby when the topmost rack of the elevator reaches a position level with the topmost rack of the car to be loaded said trip will be engaged and said driving means actuated.

In testimony whereof I affix my signature.

ROY P. M. DAVIS.